(No Model.)

E. B. FOX & D. V. BROWN.
EYEGLASSES.

No. 452,351. Patented May 12, 1891.

WITNESSES:
Wm H van Horn
M W Walker

INVENTORS
Edward B. Fox
Daniel V. Brown
By A. J. Van Stavoren
ATTORNEY

United States Patent Office.

EDWARD B. FOX AND DANIEL V. BROWN, OF PHILADELPHIA, PENNSYLVANIA.

EYEGLASSES.

SPECIFICATION forming part of Letters Patent No. 452,351, dated May 12, 1891.

Application filed June 25, 1888. Serial No. 278,155. (No model.)

*To all whom it may concern:*

Be it known that we, EDWARD B. FOX and DANIEL V. BROWN, citizens of the United States, residing at Philadelphia, in the county of Philadelphia and State of Pennsylvania, have invented certain new and useful Improvements in Spectacles and Eyeglasses, of which the following is a specification, reference being had therein to the accompanying drawings, wherein—

Figure 1:
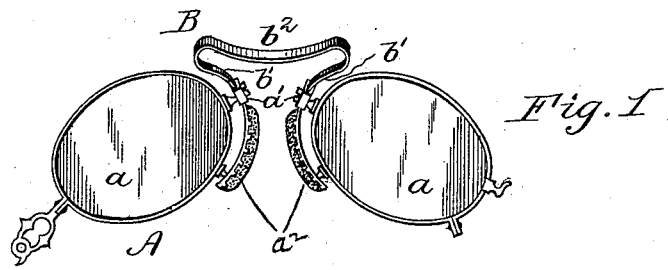
Figure 2:
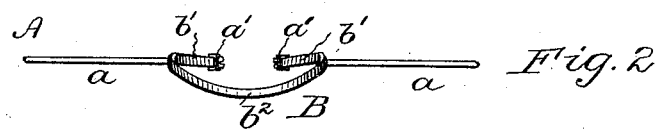
Figure 3:
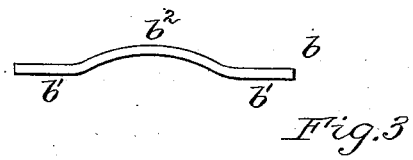
Figure 4:
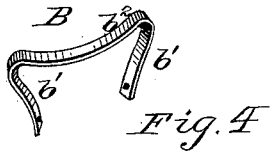

Figure 1 is a perspective of a pair of eyeglasses having a nose-band, bridge, or spring embodying our improvements. Fig. 2 is a top edge view of same. Fig. 3 is a plan of blank from which the band, bridge, or spring is formed; and Fig. 4 is a perspective of the band, bridge, or spring detached from the eyeglass.

Our invention has relation to that form of flat strip or ribbon-plate nose-bands, bridges, or springs for eyeglasses which project forwardly from the plane of the lenses, so as to avoid the brow of the wearer and admit of setting or placing the glasses nearer to the eyes without, if desired, the band, bridge, or spring contacting with the brow of the wearer; and it has for its object to provide a spring or band of a neat and sightly appearance, which is susceptible of being attached to the usual form of band or spring boxes on the lenses or on the frames therefor already in use as well as upon those being manufactured; or, in other words, the band or spring is so constructed that its middle or nose part projects beyond the plane of the lenses and yet requires no specially-designed and located end boxes for use in connection with the same.

Our invention accordingly consists of a band or spring having straight ends or ends which are in line with the plane of the lenses and a middle or nose part which curves outwardly to project beyond the plane of the lenses, the band or spring being preferably made from a blank strip or ribbon of metal having straight ends and an intervening outward curvature in its length or body, which curvature is duly maintained when the straight ends are bent downwardly to complete the configuration of the band or spring.

Reference being had to the accompanying drawings, A represents a pair of eyeglasses; $a\ a$, the lenses of the usual or other desired form, which are shown provided with band or spring boxes $a'\ a'$ and nose-pads $a^2\ a^2$ of the usual or other desired construction; and B, the band, bridge, or spring uniting the glasses. The spring or band B is made from a blank of preferably a flat piece or ribbon of metal $b$, stamped or cut in a die or otherwise, as desired, and when formed has straight ends $b'$ and an intermediate outward curve $b^2$ in its length or body, as shown more plainly in Fig. 3. The ends $b'$ are by means of pliers or formers bent over or down, as shown more plainly in Fig. 4, to complete the configuration of the band or spring B without affecting or changing the degree of curvature $b^2$, which projects forwardly or in advance of the ends $b'$. A band or spring so curved and formed, when attached to the lenses or their frames or to the spring-boxes $a'$, assumes a position relatively to the lenses $a\ a$, as shown in Fig. 1—that is to say, the ends $b'\ b'$ of the band are in line with and the curvature $b^2$ is in advance of the plane of the lenses— so that the lenses can be adjusted close to the eyes without the band or spring B coming in contact with the brow of the wearer. The form of band or spring herein shown is of a neat or sightly appearance, and as its outward curvature $b^2$ projects in front of the plane of the lenses and its ends $b'$ are of extended lengths, and are in the plane of the lenses and conform to the adjacent peripheral configuration of the lenses, the band can be attached to the usual form of band or spring boxes or to the frames of glasses already made as well as those to be made.

We are aware that flat plate or strip nose-bands, bridges, or springs for eyeglasses have been inclined forwardly in order to bring the same beyond the plane of the lenses, for the purpose of either avoiding contact with the brow of the wearer or to bring the lenses nearer to the eyes; but in such cases the blank from which the band is made is not formed with an intervening outward curvature as it is cut or stamped from the plate, and the ends of such bands are either pivoted to the framework of the eyeglasses or inserted in inclined boxes or supports.

Our invention avoids the use of the inclined boxes or attachment. When our improved band or bridge is used in connection with spectacle frames or lenses, it may be of spring or non-elastic material, as desired, and if necessary any suitable form in cross-section may be given to the band for use with either spectacles or eyeglasses.

We are aware that spectacle nose-bands or bridges made from a piece of wire which is first bent or bowed in the middle of its length and then has its ends turned or bent downwardly so as to cause the bridge to project beyond the plane of the glasses are old; but our invention differs from the same, as it embraces a flat strip, band, or bridge, in which the curvature is cut or stamped in the blank as it is cut or stamped from the plate or ribbon of metal.

What we claim is—

1. An eyeglass band, bridge, or spring composed of a flat or ribbon-shaped bar made from a blank or strip having straight ends and an intervening outward curve, substantially as set forth.

2. An eyeglass-band of a flat or ribbon-shaped strip of metal having a middle outward curvature in its length or body formed in the blank from which the band is made, substantially as set forth.

3. An eyeglass-band having an outward curvature $b^2$, projecting beyond the plane of the lenses, and extended lengths of ends $b'$ in line with and conforming to the curve of said lenses, substantially as set forth.

4. As a new article of manufacture, an eyeglass-band or spring-blank B of a flat or ribbon-shaped strip of metal having straight ends $b'$ and an intermediate outward curvature $b^2$, substantially as set forth.

5. As a new article of manufacture, an eyeglass-band of a flat or ribbon-shaped strip of metal having an outward curvature $b^2$ in its length or body and extended length of bent ends $b'$ out of the plane of said curvature, substantially as set forth.

In testimony whereof we affix our signatures in presence of two witnesses.

EDWARD B. FOX.
DANIEL V. BROWN.

Witnesses:
HENRY B. LONGBINE,
THEO. C. WARNER.